(12) United States Patent
Lee

(10) Patent No.: US 11,280,873 B2
(45) Date of Patent: Mar. 22, 2022

(54) SUNLIGHT SENSING APPARATUS OF SUNLIGHT TRACKER COMPRISING PLURAL SENSORS WITH A CONTROL OPERATION DRIVEN BY THE SENSOR POWER CHARGED BY A POWER SUPPLY PORTION

(71) Applicants: SUNG CHANG CO.,LTD, Cheongju-si (KR); SUNGCHANG ENERGY LAB, Cheongju-si (KR)

(72) Inventor: Jae Jin Lee, Cheongju-si (KR)

(73) Assignees: SUNG CHANG CO.,LTD., Cheongju-si (KR); SUNGCHANG ENERGY LAB, Cheongju-si (KR)

( * ) Notice: Subject to any disclaimer, the term of this patent is extended or adjusted under 35 U.S.C. 154(b) by 375 days.

(21) Appl. No.: 16/578,115

(22) Filed: Sep. 20, 2019

(65) Prior Publication Data

US 2021/0025963 A1    Jan. 28, 2021

(30) Foreign Application Priority Data

Jul. 24, 2019  (KR) .......................... 10-2019-0089513

(51) Int. Cl.
*G01S 3/786* (2006.01)
*H02S 20/32* (2014.01)

(52) U.S. Cl.
CPC .............. *G01S 3/786* (2013.01); *H02S 20/32* (2014.12)

(58) Field of Classification Search
CPC ........ H02S 20/32; F24S 50/20; G01S 3/7861; G01S 3/786; G05D 3/105
USPC .......................................... 250/203.4, 214 R
See application file for complete search history.

(56) References Cited

U.S. PATENT DOCUMENTS 9,070,806 B2 * 6/2015 Lee .......................... F24S 50/00

FOREIGN PATENT DOCUMENTS

| JP | 2002-094104 A | 3/2002 |
| JP | 2010-230604 A | 10/2010 |
| KR | 10-2012-0139297 A | 12/2012 |
| KR | 10-2016-0095532 A | 8/2016 |
| WO | WO 2016/052607 A1 | 4/2016 |

OTHER PUBLICATIONS

Japanese Office Action dated Nov. 4, 2020 to corresponding Japanese Application No. 2019-171653.

* cited by examiner

*Primary Examiner* — Que Tan Le
(74) *Attorney, Agent, or Firm* — Stein IP, LLC

(57) ABSTRACT

The sunlight sensing apparatus includes a sensor portion which includes a first sensor sensing sunlight in a first direction and a second sensor sensing the sunlight in a second direction for altitude adjustment and includes a third sensor sensing the sunlight in a third direction and a fourth sensor sensing the sunlight in a fourth direction for horizontal rotation, in which the first sensor, the second sensor, the third sensor, and the fourth sensor are formed of the solar cells, a power supply portion which charges sensor power formed at the first sensor, the second sensor, the third sensor, and the fourth sensor through a photoelectric effect caused by the sunlight, and a control portion which performs a control operation for transmitting sensing signals. Here, the control portion is driven by the sensor power charged by the power supply portion.

6 Claims, 7 Drawing Sheets

SUNLIGHT SENSING APPARATUS OF SUNLIGHT TRACKER COMPRISING PLURAL SENSORS WITH A CONTROL OPERATION DRIVEN BY THE SENSOR POWER CHARGED BY A POWER SUPPLY PORTION

CROSS-REFERENCE TO RELATED APPLICATION

This application claims priority to and the benefit of Korean Patent Application No. 10-2019-0089513, filed on Jul. 24, 2019, the disclosure of which is incorporated herein by reference in its entirety.

BACKGROUND

1. Field of the Invention

The present invention relates to a sunlight tracker, and more particularly, to a sunlight sensing apparatus capable of sensing sunlight without an additional power source.

2. Discussion of Related Art

Recently, due to a lack of energy and environmental pollution of the earth, developments of eco-friendly alternative energy have been sought after. As one of them, rapid advances have been made in development and application of solar energy. A variety of apparatuses for using solar energy as one of such alternative energies, that is, solar (light) cell, solar heating apparatus, and the like have been developed.

The solar energy becomes not only a source of energy necessary for our daily lives but also motive power of a variety of meteorological phenomena or sea currents. In addition, as examples of using solar energy, a solar water heater, a solar-heated house, a solar furnace, a solar power generator, and the like are present in addition to a solar cell.

Solar energy is a clean, renewable, and unlimited energy source. A sunlight technology is a system technology of converting solar energy. Since there is no mechanical or chemical action during an energy conversion process, a system has a simple structure, which hardly requires maintenance and repair, has a long life of 20 to 30 years, and is safe and eco-friendly. Also, a variety of power generation scales from a house to a large-scaled power generation facility may be provided.

In such a developing process, a sunlight tracker, which allows a solar energy collecting apparatus to track a direction of the sun, has been provided to efficiently use solar energy.

The sunlight tracker includes a sunlight sensing apparatus to track sunlight. However, in the case of a conventional optical-sensor type sunlight sensing apparatus, it is necessary to supply operational power to drive an optical sensor. Accordingly, in order to use an optical sensor type apparatus, it is necessary to provide an operational power source for driving an optical sensor and power source connecting modules for connecting the operational power source to the optical sensor.

Accordingly, in the case of the optical sensor type apparatus, power consumption caused by supply of operational power is necessarily needed such that a structure of a sunlight tracker becomes complicated and increases in scale.

RELATED ART DOCUMENT

Patent Document (Patent Document 0001) Korean Patent Publication No. 10-2012-0139297 (Dec. 27, 2012)

SUMMARY OF THE INVENTION

The present invention is directed to provide a sunlight sensing apparatus of a sunlight tracker, which senses sunlight and operates as a power supply source to autonomously supply power for operating the sunlight sensing apparatus.

According to an aspect of the present invention, there is provided a sunlight sensing apparatus included in a sunlight tracker. The sunlight sensing apparatus includes a sensor portion which includes a first sensor sensing sunlight in a first direction and a second sensor sensing the sunlight in a second direction for altitude adjustment and includes a third sensor sensing the sunlight in a third direction and a fourth sensor sensing the sunlight in a fourth direction for horizontal rotation, in which the first sensor, the second sensor, the third sensor, and the fourth sensor are formed of the solar cells, a power supply portion which charges sensor power formed at the first sensor, the second sensor, the third sensor, and the fourth sensor through a photoelectric effect caused by the sunlight, and a control portion which performs a control operation for transmitting sensing signals of the first sensor, the second sensor, the third sensor, and the fourth sensor. Here, the control portion is driven by the sensor power charged by the power supply portion.

In the sensor portion, the first sensor, the third sensor, the second sensor, and the fourth sensor may be sequentially arranged and connected in series.

The sunlight sensing apparatus may further include a wireless communication portion which wirelessly transmits wireless sensing signals of the first sensor, the second sensor, the third sensor, and the fourth sensor to the operation-performing apparatus through a wireless communication network according to an operation of the control portion.

The wireless communication portion may include a short-range wireless communication module for communicating with a short-range wireless communication network of the wireless communication network.

The power supply portion may include a charging module for charging the sensor power, a battery module which stores the sensor power transmitted through the charging module, and a discharge module which provides the control portion with the sensor power stored in the battery module.

The first sensor may be disposed in a first sector of a crossed partition divided into four sectors on a plate, the second sensor may be disposed in a second sector symmetrical to the first sector on the basis of a central point of the crossed partition, the third sensor may be disposed in a third sector located on a side surface of the first sector, and the fourth sensor may be disposed in a fourth sector symmetrical to the third sector on the basis of the central point.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, exemplary embodiments of the present invention will be described in detail with reference to the attached drawings.

The embodiments of the present invention are provided to more completely explain the present invention to one of ordinary skill in the art. The following embodiments may be modified into a variety of different forms, and the scope of the present invention is not limited thereto. The embodiments are provided to make the disclosure more substantial and complete and to completely convey the concept of the present invention to those skilled in the art.

The terms used herein are to explain particular embodiments and are not intended to limit the present invention. As used herein, singular forms, unless contextually defined otherwise, may include plural forms. Also, the terms "comprise" and/or "comprising" are used herein to specify the present of stated shapes, numbers, steps, operations, members, elements, and/or groups thereof but do not preclude the presence or addition of one or more other shapes, numbers, operations, members, elements and/or groups thereof. As used herein, the term "and/or" includes any and all combinations or one of a plurality of associated listed items.

Figure 1:
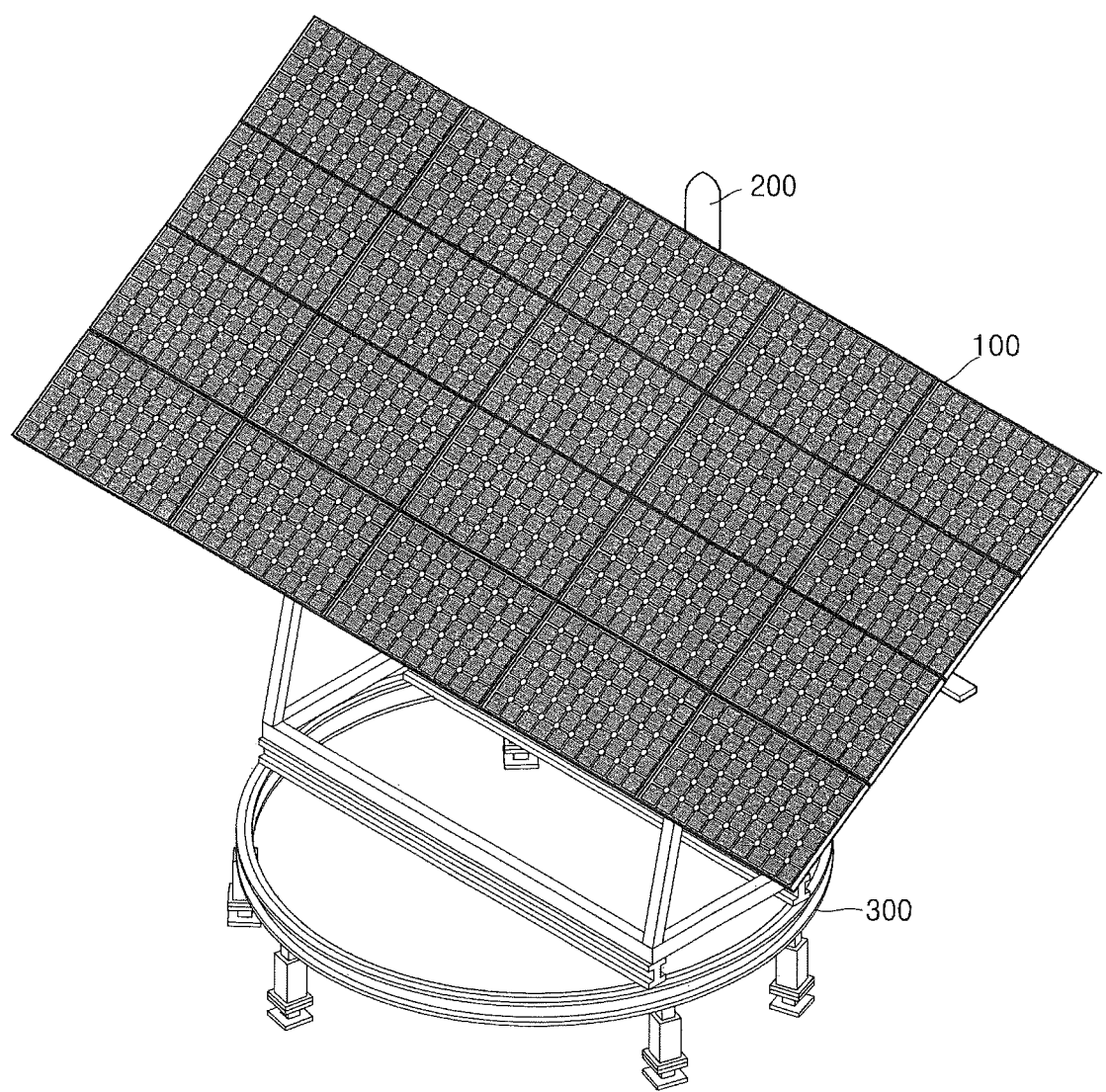
FIG. 1 is a reference view of a sunlight tracker which operates according to sensing of sunlight according to the present invention.

FIG. 1 is a reference view of a sunlight tracker which operates according to sensing of sunlight according to the present invention.

Referring to FIG. 1, the sunlight tracker which operates according to sensing of sunlight includes a sunlight condensing plate 100, a sunlight sensing apparatus 200, and an operation-performing apparatus 300.

The sunlight condensing plate 100 includes a plurality of solar cells installed therein. The solar cell is a device which generates power using a photoelectric effect in which electrons are discharged when a metallic surface of the solar cell is exposed to sunlight. The sunlight condensing plate 100 includes the plurality of solar cells.

The sunlight sensing apparatus 200 senses sunlight for altitude adjustment and horizontal rotation of the sunlight condensing plate 100. The sunlight sensing apparatus 200 will be described below in detail.

The operation-performing apparatus 300 performs an altitude adjusting operation and a horizontal rotation operation of the sunlight condensing plate 100 according to a sensing result of the sunlight sensing apparatus 200. To this end, the operation-performing apparatus 300 may include a tracker driving module (not shown), an altitude adjusting module (not shown), a level adjusting module (not shown), and the like.

The tracker driving module outputs driving values for altitude adjustment and/or horizontal rotation of the sunlight condensing plate 100 according to an output voltage of the sunlight sensing apparatus 200. The tracker driving module outputs an output voltage caused by resistances of a first sensor and a second sensor of the sunlight sensing apparatus 200 as an altitude adjustment driving value and outputs an output voltage caused by resistances of a third sensor and a fourth sensor as a horizontal rotation driving value.

The altitude adjusting module performs altitude adjustment of the sunlight condensing plate 100 according to the altitude adjustment driving value of the tracker driving module. An altitude adjusted by the altitude adjusting module does not indicate generally used content, that is, a height of a celestial body measured on the basis of the horizon as an angle and may indicate an angle between the sunlight condensing plate 100 and the horizon which is not an angle and may have a range of 0 degree to 90 degrees. Here, driving power of the altitude adjusting module may be supplied from the solar cells of the sunlight condensing plate 100.

A horizontal rotation module performs horizontal rotation of the sunlight condensing plate 100 according to a horizontal rotation driving value of the tracker driving module. Here, driving power of the horizontal rotation module may be supplied from the solar cells of the sunlight condensing plate 100.

Figure 2:
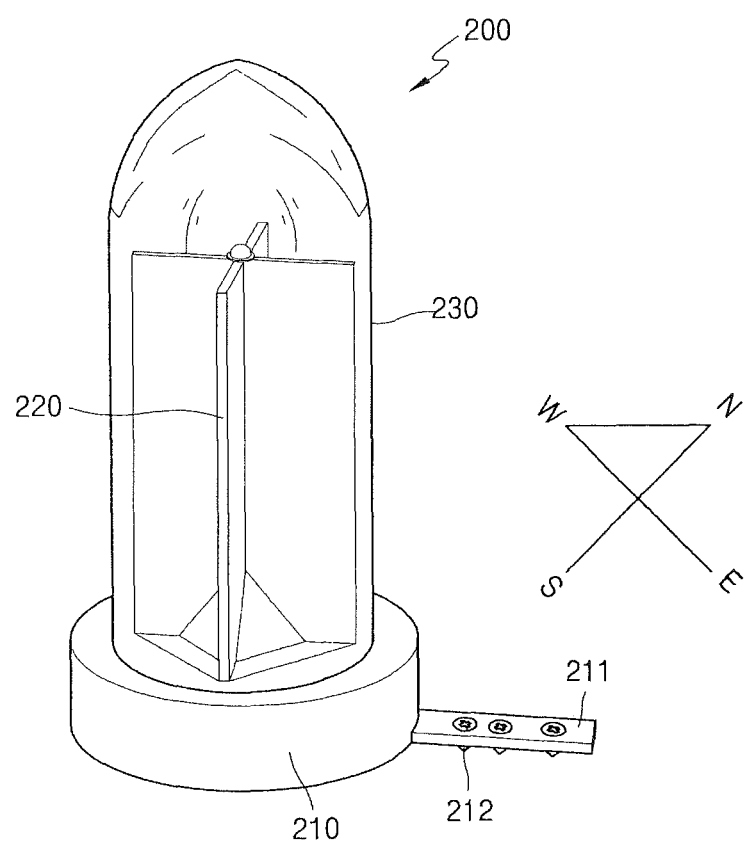
FIG. 2 is a perspective view illustrating a structure of the sunlight sensing apparatus according to the present invention.
Figure 3:
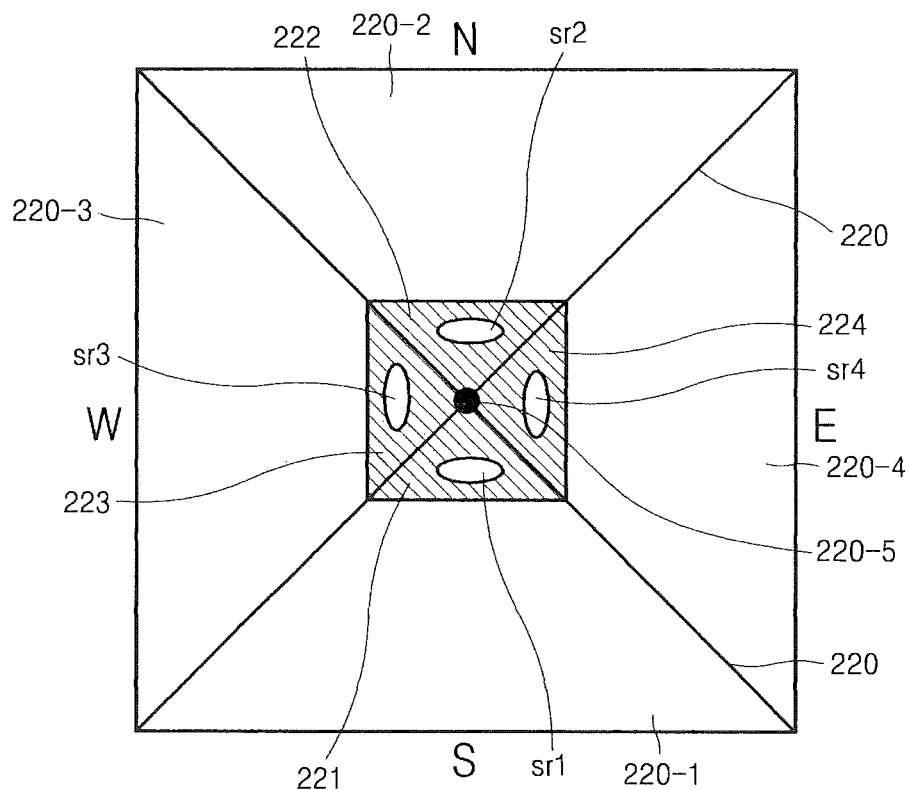
FIG. 3 is a reference view illustrating that first to fourth sensors are disposed in sectors formed by a crossed partition shown in FIG. 2.
Figure 4:
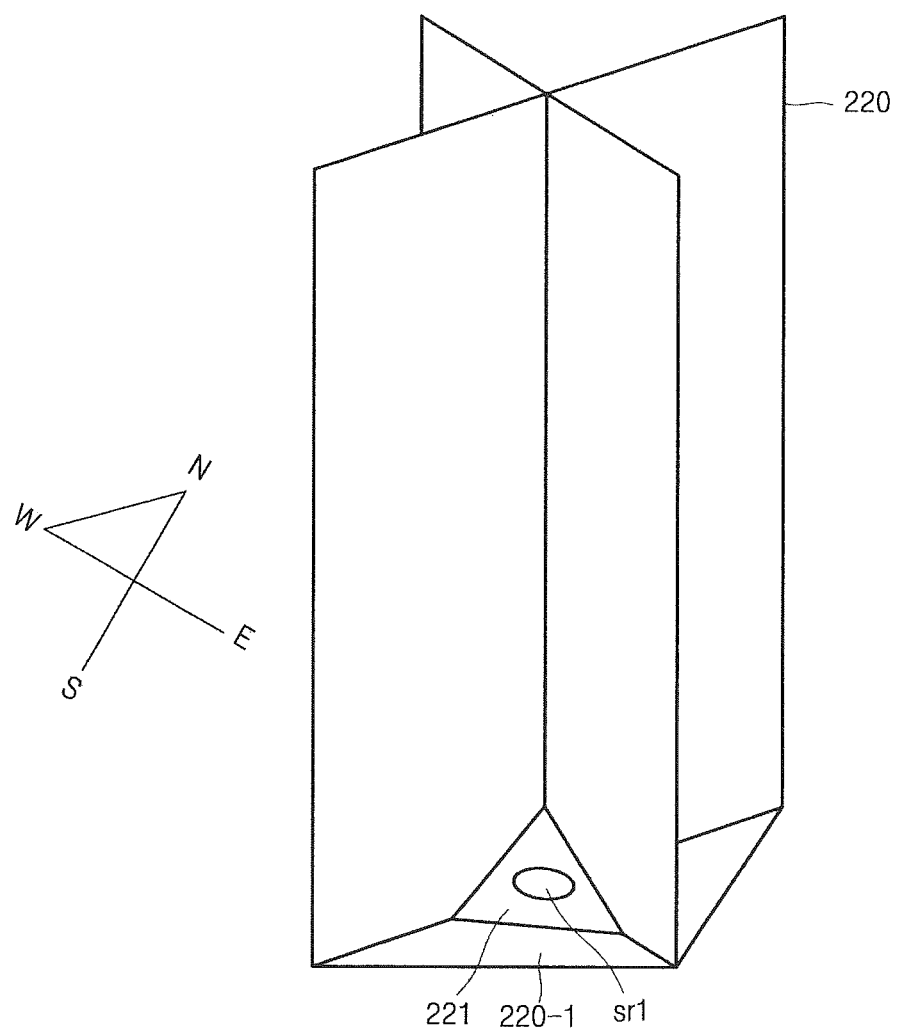
FIG. 4 is a reference view illustrating the first sensor formed on a first plate having a first inclination angle on a bottom surface of a first sector formed by the crossed partition shown in FIG. 2.

FIG. 2 is a perspective view illustrating a structure of the sunlight sensing apparatus 200 according to the present invention, FIG. 3 is a reference view illustrating that the first to fourth sensors are disposed in sectors formed by a crossed partition shown in FIG. 2, and FIG. 4 is a reference view illustrating the first sensor formed on a first plate having a first inclination angle on a bottom surface of a first sector formed by the crossed partition shown in FIG. 2.

Referring to FIGS. 2 to 4, the sunlight sensing apparatus 200 includes a plate 210, a crossed partition 220, and a protection cap 230.

The plate 210 corresponds to a container for accommodating a functional block which performs a significant function of the sunlight sensing apparatus 200. Also, the plate 210 performs a function of supporting the crossed partition 220 and the protection cap 230.

The plate 210 may be a light-absorbing material which does not reflects or scatters light. Also, the plate 210 includes a fixing member 211 and a screw 212 on one side and may be fixed and coupled to the sunlight condensing plate 100 by the fixing member 211 and the screw 212.

The crossed partition 220 is a partition member which forms first to fourth sectors 220-1, 220-2, 220-3, and 220-4 for accommodating first to fourth sensors sr1, sr2, sr3, and sr4. Here, the first sector 220-1 and the second sector 220-2 are disposed to be symmetrical to each other on the basis of a central point 220-5 of the crossed partition 220, and the third sector 220-3 and the fourth sector 220-4 are disposed to be symmetrical to each other on the basis of the central point 220-5 of the crossed partition 220. The crossed partition 220 may be a light-absorbing material which does not reflects or scatters light.

Also, a first sensor plate 221 is disposed at a first inclination angle with respect to a bottom surface of the first sector 220-1, a second sensor plate 222 is disposed at a second inclination angle with respect to a bottom surface of the second sector 220-2, a third sensor plate 223 is disposed at a third inclination angle with respect to a bottom surface of the third sector 220-3, and a fourth sensor plate 224 is disposed at a fourth inclination angle with respect to a bottom surface of the fourth sector 220-4. The first inclination angle, the second inclination angle, the third inclination angle, and the fourth inclination angle may be equal to or different from one another. When all of the first inclination angle, the second inclination angle, the third inclination angle, and the fourth inclination angle are equal, they may be 45 degrees but are not limited thereto.

Also, the first sensor sr1 is formed on the first sensor plate 221 and senses sunlight incident from below (south) on the basis of a forward direction of the sunlight condensing plate 100, and the second sensor sr2 is formed on the second sensor plate 222 and senses sunlight incident from above (north) on the basis of the forward direction of the sunlight condensing plate 100. Also, the third sensor sr3 is formed on the third sensor plate 223 and senses sunlight incident from left (east) on the basis of the forward direction of the sunlight condensing plate 100, and the fourth sensor sr4 is formed on the fourth sensor plate 224 and senses sunlight incident from right (west) on the basis of the forward direction of the sunlight condensing plate 100.

The protection cap 230 is a transparent material transmitting light, covers the crossed partition 220 and the first to fourth sensors sr1, sr2, sr3, and sr4, and has a bottom end coupled with the plate 210. A body of the protection cap 230 has a cylindrical structure having one open side to accommodate the crossed partition 220 and includes a conic-shaped closed-curve structure on the other side, that is, a top end portion of the cylindrical structure. A bottom end portion of the protection cap 230 may be fixed to the plate 210 through screw coupling, adhesive coupling, or the like.

Figure 5:
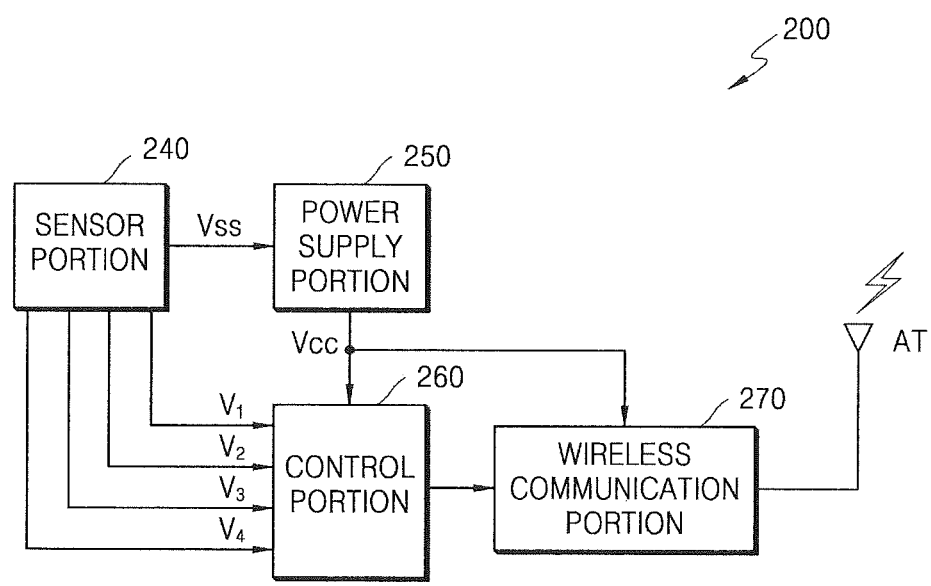
FIG. 5 is a functional block diagram illustrating a function of the sunlight sensing apparatus according to one embodiment of the present invention which is shown in FIG. 2.

FIG. 5 is a functional block diagram illustrating a function of the sunlight sensing apparatus 200 according to one embodiment of the present invention which is shown in FIG. 2.

Referring to FIG. 5, the sunlight sensing apparatus 200 includes a sensing portion 240, a power supply portion 250, a control portion 260, and a wireless communication portion 270.

The sensor portion 240 includes a first sensor which senses sunlight in a first direction and a second sensor which senses the sunlight in a second direction for altitude adjustment. Also, the sensor portion 240 includes a third sensor which senses sunlight in a third direction and a fourth sensor which senses the sunlight in a fourth direction for horizontal rotation.

The sensor portion 240 may include one or more first sensors which face the sun and one or more second sensors which sense sunlight in a direction different from that of the first sensors and may be formed by electrically connecting the first sensors and the second sensors in series. Also, the sensor portion 240 may include one or more third sensors which face the sun and one or more fourth sensors which sense sunlight in a direction different from that of the third sensors and may be formed by electrically connecting the third sensors and the fourth sensors in series.

As described with reference to FIG. 3, the first sensor sr1 may be disposed in the first sector of the crossed partition divided into four sectors on the plate, the second sensor sr2 may be disposed in the second sector symmetrical to the first sector on the basis of a central point of the crossed partition, the third sensor sr3 may be disposed in the third sector located on a side surface of the first sector, and the fourth sensor sr4 may be disposed in the fourth sector symmetrical to the third sector on the basis of the central point.

Figure 6:
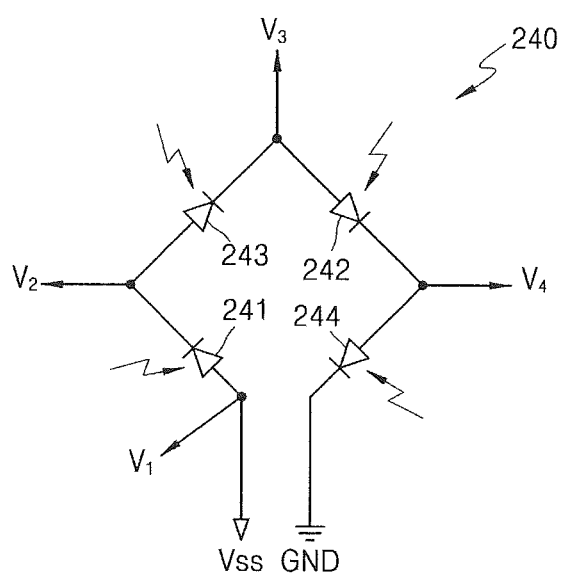
FIG. 6 is a reference view illustrating a circuit structure of the first sensor to the fourth sensor included in a sensor portion shown in FIG. 5.

FIG. 6 is a reference view illustrating a circuit structure of first to fourth sensors 241, 242, 243, and 244 which form the sensor portion 240.

Referring to FIG. 6, the first sensor 241, the third sensor 243, the second sensor 242, and the fourth sensor 244 which form the sensor portion 240 are sequentially arranged and are connected in series. Meanwhile, although not shown in the drawing, the first sensor 241, the second sensor 242, the third sensor 243, and the fourth sensor 244 may be sequentially arranged and may be connected in series.

According to the present invention, each of the first to fourth sensors 241, 242, 243, and 244, which form the sensor portion 240, is formed of a solar cell. The first to fourth sensors 241, 242, 243, and 244 formed of solar cells sense sunlight and transmit voltage-sensing signals $V_1$, $V_2$, $V_3$, and $V_4$ according to sensing of sunlight.

Meanwhile, since the solar cell corresponds to a device capable of generating power using a phenomenon of discharging electrons using sunlight as described above, the first to fourth sensors 241, 242, 243, and 244 connected by the solar cell in series may generate sensor power $V_{SS}$ according to a photoelectric effect caused by sunlight in addition to a sunlight sensing function.

For example, when it is assumed that a voltage of 0.6 V is generated for each solar cell while four solar cells corresponding to the first to fourth sensors 241, 242, 243, and 244 are connected in series, a voltage of 0.6*4=2.4V may be obtained. That is, the first to fourth sensors 241, 242, 243, and 244 are formed of solar cells such that a voltage (power) may be generated by the photoelectric effect caused by sunlight.

Since the sensor portion 240 is electrically connected to the power supply portion 250 and the power source portion 250 has a circuit structure for charging power, the sensor power $V_{SS}$ generated by the first to fourth sensors 241, 242, 243, and 244 of the sensor portion 240 is transmitted to the power source portion 250.

The power supply portion 250 charges the sensor power $V_{SS}$ formed at the first to fourth sensors 241, 242, 243, and 244 by the photoelectric effect caused by sunlight.

Figure 7:
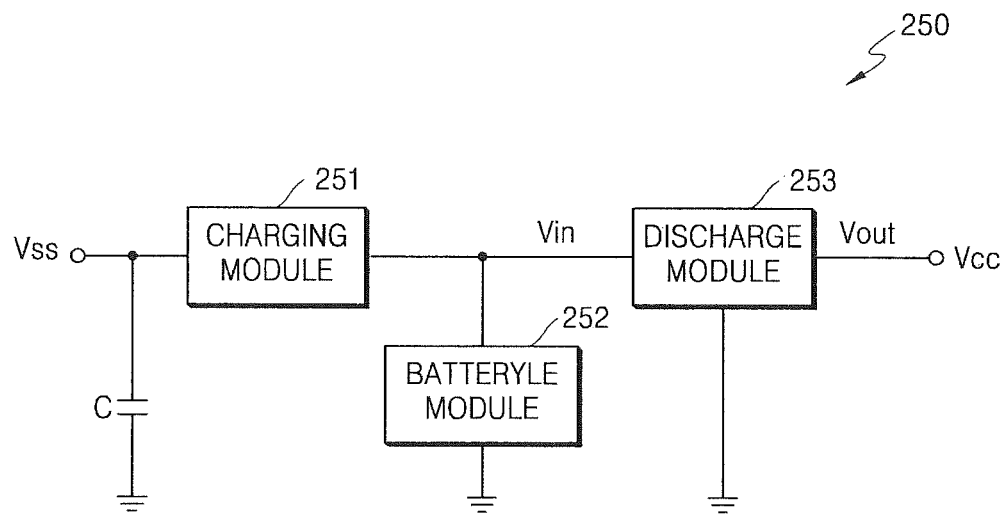
FIG. 7 is a circuit diagram illustrating a functional block which forms a power supply portion shown in FIG. 5.

FIG. 7 is a circuit diagram illustrating a functional block which forms the power supply portion 250 shown in FIG. 5.

Referring to FIG. 7, the power supply portion 250 may include a charging module 251, a battery module 252, and a discharge module 253.

The charging module 251 is a module which receives the sensor power $V_{SS}$ formed at the first to fourth sensors 241, 242, 243, and 244 and performs an electrostatic voltage charging operation, a constant current charging operation, or a simple bypass charging operation with respect to the received sensor power $V_{SS}$.

The battery module 252 stores the sensor power $V_{SS}$ transmitted through the charging module 251 using a power charging device. For example, the battery module 252 provides and stores sensor power $V_{SS}$=2.4V transmitted from the sensor portion 240.

The discharge module 253 adjusts the sensor power $V_{SS}$ stored in the battery module 252 for driving power $V_{CC}$ for an operation of the control portion 260 or the wireless communication portion 270 and outputs the driving power $V_{CC}$. For example, the discharge module 253 generates lower driving power $V_{CC}$ (for example, 1.8 V and the like) by regulating a voltage of 2.4 V stored in the battery module 252. Accordingly, the generated driving power $V_{CC}$ may be transmitted to the control portion 260 or the wireless communication portion 270 and may be used as power for the operation of the control portion 260 or the wireless communication portion 270.

The control portion 260 performs a control operation for wirelessly transmitting a sensing signal with respect to sunlight sensed by the sensor portion 240 to the operation-performing apparatus 300. The control portion 260 uses the driving power $V_{CC}$ supplied from the power supply portion 250 as power for performing the control operation. To receive the driving power $V_{CC}$, the control portion 260 is electrically connected to the power supply portion 250.

Meanwhile, the control portion 260 receives the sensing signals $V_1$, $V_2$, $V_3$, and $V_4$ with respect to sunlight sensed by the first to fourth sensors 241, 242, 243, and 244 of the sensor portion 240 from the sensor portion 240. To receive the respective sensing signals $V_1$, $V_2$, $V_3$, and $V_4$, the control portion 260 is electrically connected to the sensor portion 240. Accordingly, the control portion 260 transmits a control signal for wirelessly transmitting the sensing signals $V_1$, $V_2$, $V_3$, and $V_4$ provided from the sensor portion 240 to the wireless communication portion 270.

Accordingly, power generated by the sensor portion 240 itself is used as power for driving the control portion 260 such that an operation of sensing of sunlight and an operation of wirelessly transmitting the sensing signal may be performed without additional power supply.

The wireless communication portion 270 wirelessly transmits the sensing signals $V_1$, $V_2$, $V_3$, and $V_4$ provided from the sensor portion 240 to the operation-performing apparatus 300 through a wireless communication network under the control of the control portion 260. Here, the wireless communication portion 270 includes a short-range wireless communication module for transmitting the sensing signals $V_1$, $V_2$, $V_3$, and $V_4$ through a short-range wireless communication network (for example, Bluetooth, WiFi, a wireless local area network (LAN), near field communication, and the like) among wireless communication networks.

The wireless communication portion 270 uses the driving power $V_{CC}$ supplied from the power supply portion 250 as power for wirelessly transmitting the sensing signals. To receive the driving power $V_{CC}$, the wireless communication portion 270 is electrically connected to the power supply portion 250.

According to the embodiments of the present invention, since optical sensor which forms a sunlight sensing apparatus may be used as a power supply source, the sunlight sensing apparatus may be continuously driven without an additional power supply source such that power consumption for sensing sunlight may be prevented.

Also, a signal sensed by the sunlight sensing apparatus is allowed to be transmitted through wireless communication such that it is possible to minimize complexity of a circuit component according to wired connection for driving the sunlight sensing apparatus.

The embodiments of the present invention have been described above. It will be understood by one of ordinary skill in the art that modifications may be made without departing from the scope of the essential features of the present invention. Therefore, the described embodiments should be considered in a descriptive point of view not in a limitative one. Accordingly, the scope of the present invention is not limited to the above-described embodiments and should be interpreted as including the content stated in the claims and a variety of embodiments within the equivalent scope thereof.

What is claimed is:

1. A sunlight sensing apparatus included in a sunlight tracker which comprises a sunlight condensing plate on which a plurality of solar cells are installed and an operation-performing apparatus which performs an altitude adjustment operation and a horizontal rotation operation of the sunlight condensing plate, the sunlight sensing apparatus comprising:
    a sensor portion which comprises a first sensor sensing sunlight in a first direction and a second sensor sensing the sunlight in a second direction for altitude adjustment and comprises a third sensor sensing the sunlight in a third direction and a fourth sensor sensing the sunlight in a fourth direction for horizontal rotation, in which the first sensor, the second sensor, the third sensor, and the fourth sensor are formed of the solar cells;
    a power supply portion which charges sensor power formed at the first sensor, the second sensor, the third sensor, and the fourth sensor through a photoelectric effect caused by the sunlight; and
    a control portion which performs a control operation for transmitting sensing signals of the first sensor, the second sensor, the third sensor, and the fourth sensor, wherein the control portion is driven by the sensor power charged by the power supply portion.

2. The sunlight sensing apparatus of claim 1, wherein in the sensor portion, the first sensor, the third sensor, the second sensor, and the fourth sensor are sequentially arranged and connected in series.

3. The sunlight sensing apparatus of claim 1, further comprising a wireless communication portion which wirelessly transmits wireless sensing signals of the first sensor, the second sensor, the third sensor, and the fourth sensor to the operation-performing apparatus through a wireless communication network according to an operation of the control portion.

4. The sunlight sensing apparatus of claim 3, wherein the wireless communication portion comprises a short-range wireless communication module for communicating with a short-range wireless communication network of the wireless communication network.

5. The sunlight sensing apparatus of claim 1, wherein the power supply portion comprises:
    a charging module for charging the sensor power;
    a battery module which stores the sensor power transmitted through the charging module; and
    a discharge module which provides the control portion with the sensor power stored in the battery module.

6. The sunlight sensing apparatus of claim 1, wherein, the first sensor is disposed in a first sector of a crossed partition divided into four sectors on a plate, the second sensor is disposed in a second sector symmetrical to the first sector on the basis of a central point of the crossed partition, the third sensor is disposed in a third sector located on a side surface of the first sector, and the fourth sensor is disposed in a fourth sector symmetrical to the third sector on the basis of the central point.

* * * * *